United States Patent [19]

Sindt

[11] 3,996,402

[45] Dec. 7, 1976

[54] FASTENING DEVICE FOR USE WITH INDUCTION HEATER APPARATUS AND SYSTEM FOR HOLDING TOGETHER TWO NONMETAL SURFACES

[75] Inventor: Melvin R. Sindt, Stanwood, Wash.

[73] Assignee: The Boeing Company, Seattle, Wash.

[22] Filed: Mar. 17, 1975

[21] Appl. No.: 559,341

Related U.S. Application Data

[60] Continuation-in-part of Ser. No. 448,110, March 4, 1974, abandoned, which is a division of Ser. No. 331,724, Feb. 12, 1973, Pat. No. 3,845,268.

[52] U.S. Cl. .............................. 428/140; 156/275; 219/10.79; 428/418
[51] Int. Cl.² .................. B29C 27/08; B32B 15/08; B32B 3/10; H05B 9/02
[58] Field of Search ................ 156/275; 219/10.77, 219/10.79, 10.57; 428/42, 458, 137–139

[56] References Cited

UNITED STATES PATENTS

| | | | |
|---|---|---|---|
| 1,863,186 | 6/1932 | Burns | 428/138 X |
| 2,075,373 | 3/1937 | Tomec | 428/139 |
| 2,241,312 | 5/1941 | Luty | 428/138 |
| 2,529,914 | 11/1950 | Challender | 219/528 |
| 3,510,619 | 5/1970 | Leatherman | 219/10.79 X |
| 3,574,031 | 4/1971 | Heller, Jr. et al. | 156/275 X |
| 3,576,091 | 4/1971 | Shull, Jr. et al. | 156/275 X |
| 3,612,803 | 10/1971 | Klaas | 219/10.79 X |
| 3,733,231 | 5/1973 | Rutkowski et al. | 156/71 |
| 3,756,881 | 9/1973 | Denman | 156/275 X |
| 3,846,204 | 11/1974 | Eisler | 156/275 |

Primary Examiner—Philip Dier
Attorney, Agent, or Firm—Conrad O. Gardner

[57] ABSTRACT

A fastening device having a sheet of eddy current conducting material sandwiched between two sheets of heat-activatable plastic material, the sheet of eddy current conducting material having a matrix of apertures, the sheets of heat-activatable plastic material covering the matrix area, and the device including means on an outer surface for releasably holding the device against a non-metallic surface prior to heat activation of the sheets of plastic material by an induction heater apparatus and system.

2 Claims, 13 Drawing Figures

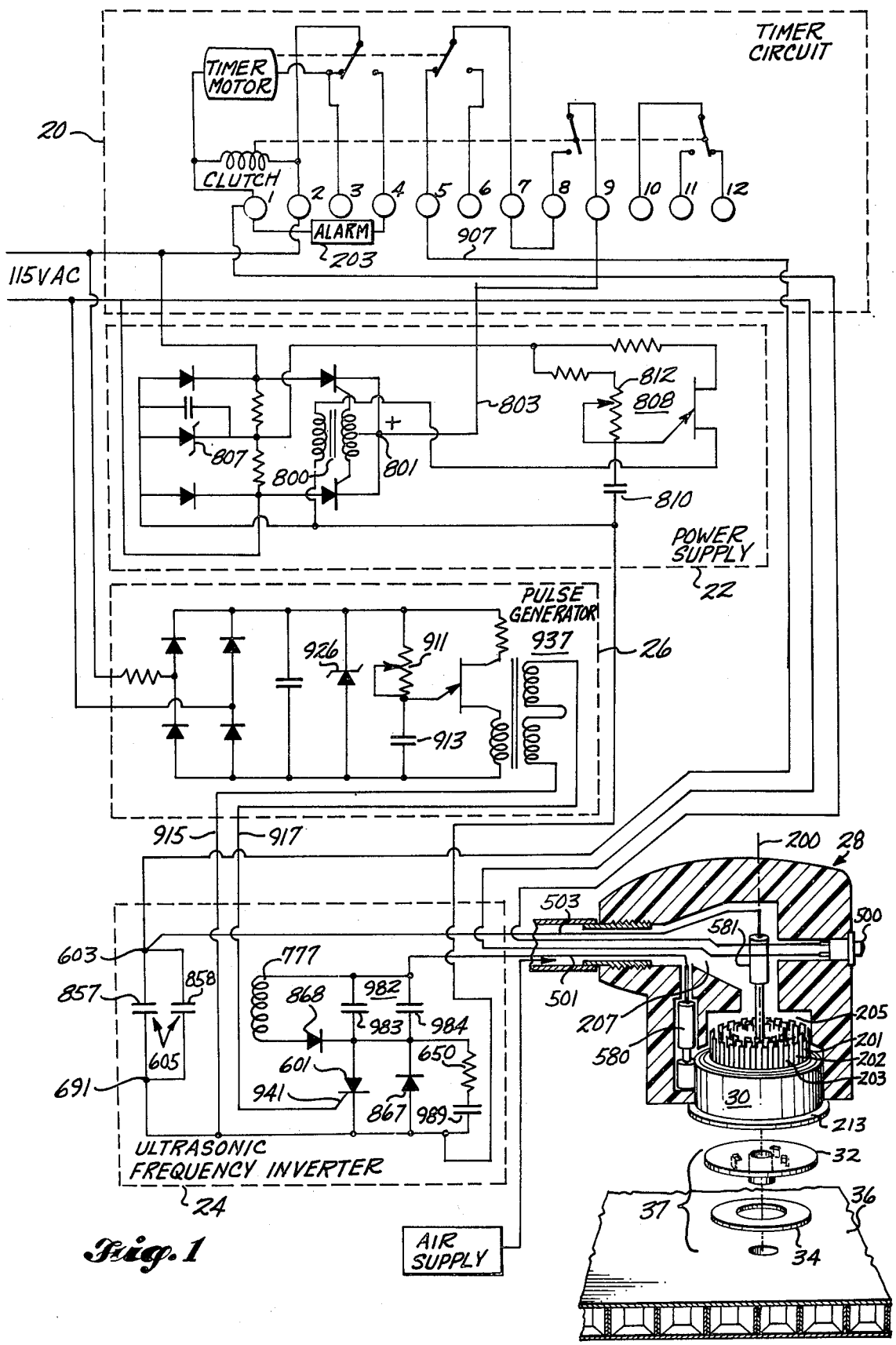

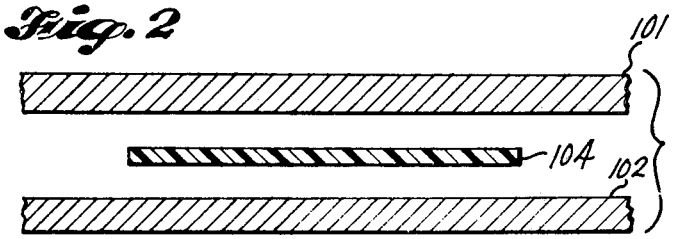
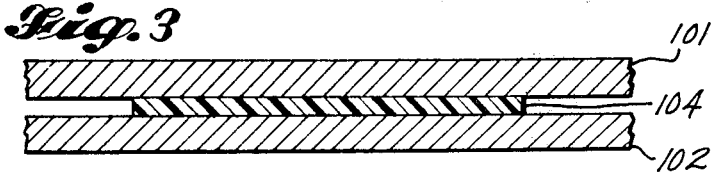
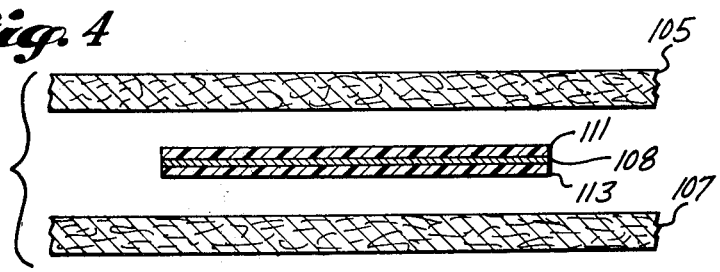
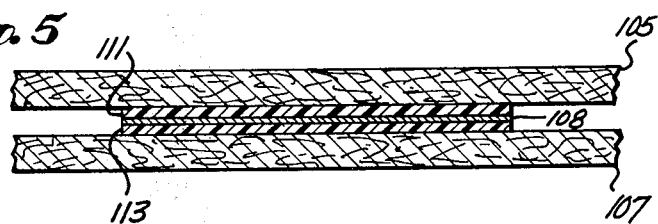
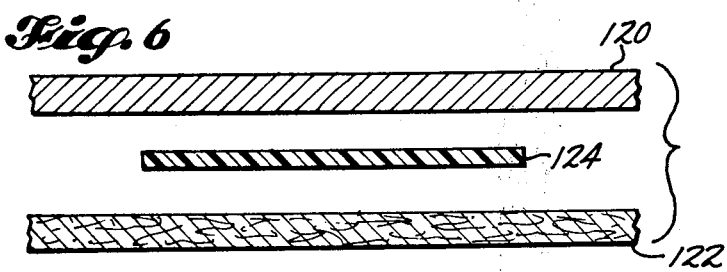
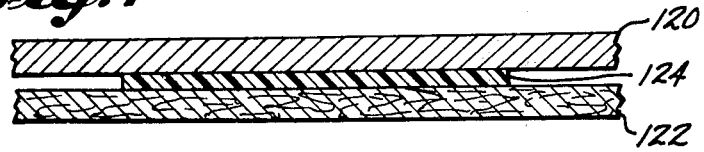

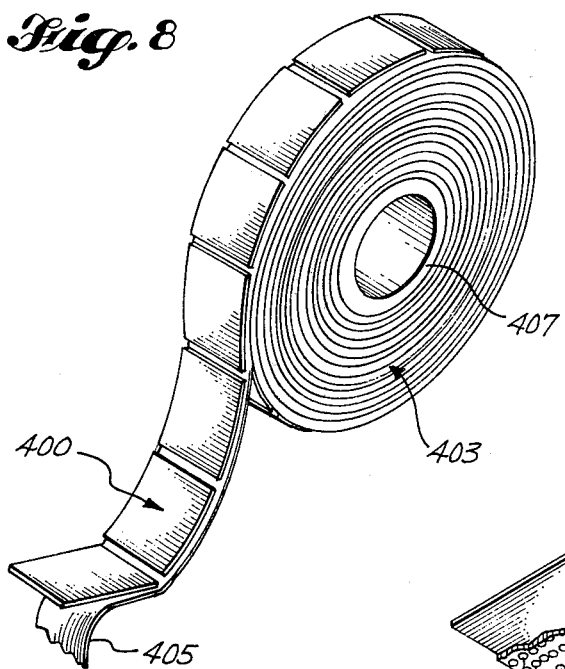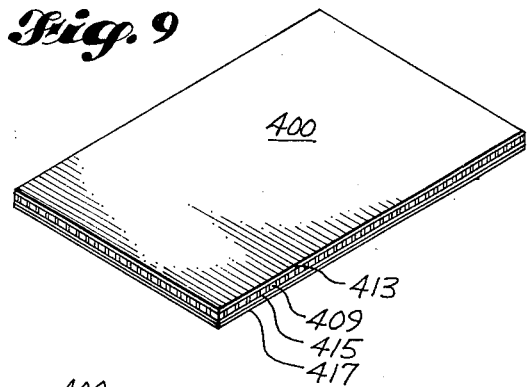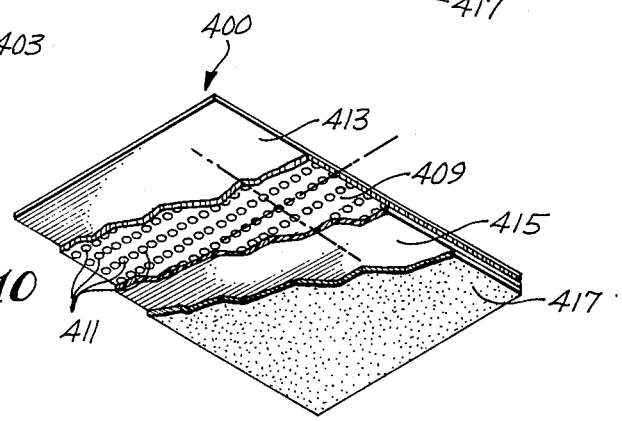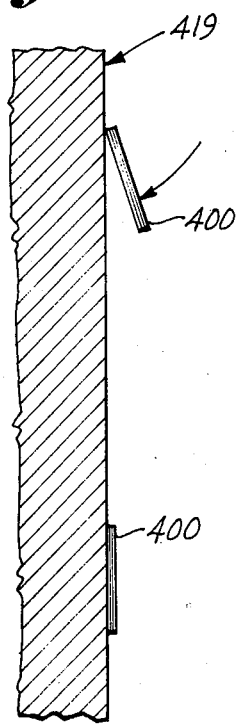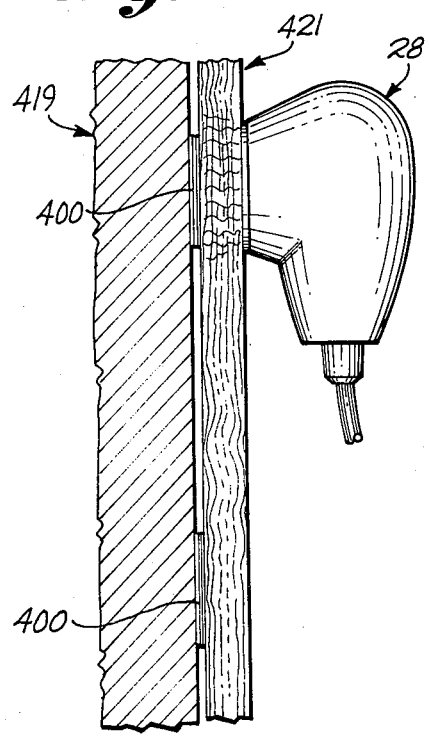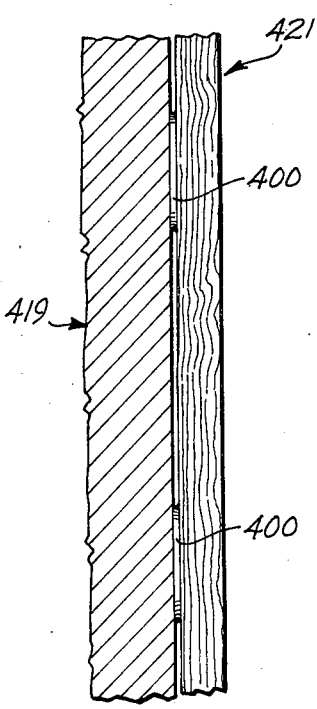

FASTENING DEVICE FOR USE WITH INDUCTION HEATER APPARATUS AND SYSTEM FOR HOLDING TOGETHER TWO NONMETAL SURFACES

This application is a continuation-in-part of application Ser. No. 448,110 filed Mar. 4, 1974 now abandoned which is a divisional of application Ser. No. 331,724, now U.S. Pat. No. 3,845,268.

This invention relates to induction heating apparatus and systems, and more particularly to an induction heating system having a multiturn coupling coil connected in circuit with an oscillator circuit.

Heating of hot melt type fasteners has in many cases been effected by the use of soldering iron type devices to cause heating of the metallic portion of the hot melt fastener thereby causing the adjacent adhesive portion in contact therewith to be activated by melting and wherein subsequent to cooling, the fastening is effected. Apparatus for inducing eddy current in conductive materials or materials containing conductive materials to support the eddy currents have become available in the commercial market place; however such apparatus is cumbersome, requires complex cooling, is heavy, requires expensive shielding to prevent radio interference and further lacks the simplicity and compactness desired in many applications.

It is accordingly an object of this invention to provide a simple, compact system utilizing semiconductor devices for efficiently developing and transmitting electrical power at relatively high levels to conductive structures for heating by eddy currents.

It is a further object of this invention to provide an eddy current generating system for heating conductive structures utilizing a multiturn magnetic field concentrating coupling coil connected in series circuit in an oscillator.

It is yet another object of the present invention to provide in an induction heating apparatus, an ultrasonic frequency electrical generator having a primary coupling coil connected in circuit for providing about 50 to 1 transformer ratios with respect to the eddy current conducting secondary.

It is a further object of this invention to provide in the secondary circuit of the present system, eddy current heat dissipating structures useful for fastening together a plurality of components.

It is another object of this invention to provide in an induction heating system a primary coupling coil having a high transformer ratio with respect to the conductor secondary and of relatively small diameter for providing high peak currents in the conductor displaced a predetermined distance from the primary and embedded in a hot melt type structure.

It is still a further object of this invention to provide a primary coil having a plurality of air cooled heat dissipating members arranged concentrically about the central axis of the air flow path and coupled to the coil in heat exchange relationship for extracting and dissipating heat generated in the coil.

The above and further objects are achieved in the present invention by coupling in an ultrasonic frequency electrical inverter circuit, a primary winding comprising a multiturn air cooled coil utilized for inducing currents by air core transformer action in the secondary circuit comprising the article to be heated.

Other objects, features, and advantages of the present invention will become apparent from the following description read on the accompanying drawing wherein:

FIG. 1 is a schematic diagram of an embodiment of an induction heater apparatus and system in accordance with the present invention;

FIG. 2 is a cross sectional view of a sandwich assembly for holding together two metal sheets prior to heating by the present induction heating apparatus of FIG. 1;

FIG. 3 is a finished sandwich structure for bonding together the two metal surfaces shown in FIG. 2;

FIG. 4 shows in cross section an assembly useful in holding together two nonmetal surfaces;

FIG. 5 is similar to FIG. 4 but shows the structure subsequent to heating by the system of FIG. 1;

FIG. 6 shows in cross section the method of assembly of metal and nonmetal sheets prior to completion of lamination of the parts by the induction heater apparatus of FIG. 1;

FIG. 7 is similar to FIG. 6; however it shows the laminated structure subsequent to heating by the apparatus of FIG. 1;

FIG. 8 is a perspective view of a roll of heat-activatable fasteners of the type detailed in FIG. 9 and FIG. 10;

FIG. 9 is a perspective view of a fastener having certain features common to the fastener shown in FIG. 4 and FIG. 5;

FIG. 10 is a perspective view broken away in partial section of the fastener of FIG. 9 to show the detailed structure of the fastener;

FIG. 11 is a view showing a step in the process for utilizing fasteners from the tape of FIG. 8 to secure a sheet of wood or other nonmetallic sheet to studding in a housing structure;

FIG. 12 is illustrative of the use of the apparatus and system of FIG. 1 to utilize the fasteners shown in FIG. 9 and FIG. 10 for hanging a panel; and FIG. 13 is illustrative of a side view of finished wall structure utilizing fasteners of FIG. 9 and FIG. 10.

Turning now to the system of FIG. 1, there is shown a plurality of circuits comprising a timer circuit 20 for controlling the application of DC voltage from a power supply circuit 22 to ultrasonic frequency inverter circuit 24, and a pulse generator circuit 26 coupled to inverter circuit 24 for triggering the SCR in inverter circuit 24 into conduction. A primary coil 30 in primary coil housing 28 when connected in circuit with ultrasonic frequency inverter 24 induces currents including eddy currents by transformer action in the current conducting secondary portion 32 of the article and effects bonding of secondary portion 32 to a non-metallic surface 36 comprising, e.g., the wall portion of an interior panel structure of an aircraft as shown.

When primary coil 30 in the system of FIG. 1 is coupled to eddy current conducting surface sheets 101 and 102 and a hot melt adhesive sheet 104 is interleaved between opposing surfaces of sheets 101 and 102 as shown in FIG. 3, the heat induced by the eddy currents is transmitted into abutting hot melt adhesive sheet 104 causing it to melt and secure upon subsequent cooling the opposing portions of the surface areas of sheets 101 and 102 which are in contact with the surface areas of adhesive sheet 104. Sheet 104 may be in the form of a narrow rectangular strip or in the shape of a spot and circular in shape depending upon the extent of securing together of sheets 101 and 102 desired or required. In the case where sheet 104 is a spot or of circular shape and of a diameter less than primary coil 30, a single time interval of heating may be required whereas when sheet 104 is in the form of a long narrow strip, coil 30 may be moved along the strip for the pre-determined time interval required to melt each portion thereof so that a complete melt along the strip is achieved.

The present system of FIG. 1 may be utilized to secure together two nonmetallic sheets 105 and 107 as shown in FIG. 4 when a laminated structure having an inner eddy current inducting sheet 108 and outer surface hot melt adhesive coating sheets 111 and 113 is positioned between nonmetallic sheets 105 and 107 and in contact with the major surface areas thereof as shown in FIG. 5 and heat inducing eddy currents are induced in eddy current conducting sheet 108 by positioning primary coil 30 against the outer surface of nonmetallic sheets 105 and 107.

The present system of FIG. 1 may be utilized to secure together metal and nonmetal sheets 120 and 122 respectively in the manner shown in FIG. 7 when a hot melt adhesive sheet 124 is positioned between metal sheet 120 and nonmetal sheet 122 as shown in FIG. 6 and the sandwich assembly is held together as shown in FIG. 7 and then heat inducing eddy currents are induced in eddy current conducting sheet 120 by placing the primary coil 30 of housing 28 against the exposed outer surface of metal sheet 120 so the eddy currents heat the region of metal sheet 120 abutting hot melt adhesive sheet 124 thereby melting sheet 124 with the subsequent cooling thereof causing solidification or thermosetting of plastic adhesive to the resultant sandwich structure of FIG. 7.

A further fastener 400 which is activatable by heat inducing eddy currents such as from the system of FIG. 1 is shown ready for dispensing from the paper roll structure 403 shown in FIG. 8. Paper roll structure 403 includes a plurality of turns of paper tape 405 having a plurality of fasteners e.g. 400 distributed along the outer surface of each of the plurality of turns wound around core member 407 which may comprise e.g., cardboard tubing. As can be seen briefly in FIG. 9, fastener 400 comprises a sheet 409 of eddy current conducting material containing a matrix of vertical columns and horizontal rows of apertures (seen in FIG. 10 with more clarity) 411 perforated therethrough and symmetrically disposed along the length and width of major surface of sheet 409. Sheet 409 can be made of 0.002 inch steel shim stock with aperture widths of about 0.050 inch, the spacing between geometrical centers of apertures 411 along the length and width of the matrix being about 0.060 inch, twice their widths (diameters if the apertures are circular holes). Sheet 409 is sandwiched between two sheets 413, 415 of heat-activatable plastic material covering at least the surface area of sheet 409 including the matrix area containing apertures 411. Sheets 413 and 415 could be e.g., coatings of Hot Melt Glue as manufactured by United Shoe Machinery Company. An outer surface of sheet 415 is coated with a contact sensitive adhesive surface 417 for releasably holding fastener 400 on paper tape 405 (see FIG. 8) prior to the pulling off thereof for application of the adhesive surface 417 against a nonmetallic surface, here stud 419 (as shown in FIG. 11). Such adhesive surface coating 417 could be e.g., a sprayable adhesive. After application of the adhesive surface 417 side of fastener 400 to stud 419 in the direction of motion shown in the upper fastener by application of hand pressure thereagainst, the fastener assumes the desired position against stud 419 as shown at the bottom of FIG. 11 where it becomes selfsupporting and does not need to be held in place any more. Panel 421 can be then raised and positioned against fasteners 400 overlying stud surface 419 in spaced apart position in a vertical sense, and then housing 28 of FIG. 1 positioned against the portion of panel 421 overlying upper one of fasteners 400, the induction heating system of FIG. 1 then activated to cause eddy current heating of sheet 409 and consequent melting of sheets 413 and 415 with fusion therebetween upon cooling through apertures 411 allowing setting upon cooling between the sheets and the outer nonmetallic surfaces 419 and 421 to be fastened together. FIG. 13 is illustrative of the completed bonds between nonmetallic surfaces 419 and 421 formed by hot melt fasteners 400. The resulting integral product provided by fasteners 400 provides actual direct hot melt bonds between nonmetallic surfaces 419 and 421 via the matrix of apertures 411 and indirect hot melt bond by way of the outer sheets 413 and 415 to the center metal sheet 409 itself.

The technology of hot melt adhesives and heat activated thermosetting adhesives is a highly developed art with selection of particular adhesive depending on the type of materials which it is desired to bond together, e.g., see U.S. Pat. No. 3,612,803. Adhesives are synthetic resins with thermoplastic or thermosetting qualities. That is, they can be softened or cured by heat, and bond materials together upon cooling. The adhesive portion 34 on the back of the eddy current conducting portion of fastener 32 of FIG. 1 comprised polyethelene whereas polyamide can be used for adhesive sheets 104, 111, 113, and 124 in the sandwich structures of FIGS. 2–7. Epoxy resins are examples of thermosetting plastics which can be used for adhesive sheets 104, 111, 113, and 124 in the sandwich structures of FIGS. 2–7. The adhesives, both thermosetting and thermoplastic, may be in sheet or powder form and applied and sintered to any component acting as the secondary of the induction heating system.

Proceeding now to a more detailed description of the induction heating system of FIG. 1 and the means and method of generating ultrasonic frequency electrical energy in circuit means 24 and coupling this energy from coil 30 acting as a transformer primary winding to metal disc-like member 32 of fastener means 37 in which member 32 which is the article to be heated forming the secondary circuit, it should be noted that the diameter of primary coil 30 is equal to or larger than the diameter of disc-like member 32 so that a complete exposure of the surface area of member 32 by the field from primary coil 30 may be had from a single positioning of primary coil 30 above and in registry with the member 32. When the object to be heated has a diameter or width, if rectangular shaped, less than the diameter of primary coil 30, less of the field or only part of the field of the coil is intercepted by the article to be heated. When it is desired to heat a rectangular or strip like object having a length greater than the diameter of primary coil 30, then repeated exposures along the length of the strip, a coil diameter at a time are required to heat the article to a predetermined temperature and thereby cause the melting of the associated hot melt material. From the preceding it can be seen that in an optimum utilization of the field generated by primary coil 30 coupled in circuit 24, the article 32 to be heated is positioned to intercept over substantially all of its entire surface area, the concentrated lines of flux provided by primary coil 30 thereby realizing a maximum heating effect.

Primary coil 30 within housing 28 comprises a plurality of turns of an insulated copper conductor having a rectangular corss-sectional area wound about a central axis 200 having interleaved between selected turns a plurality of spaced apart metallic heat conducting fins 201, 202, 203 extending from a first of the two major faces of the primary coil 30 into an air chamber 205 within housing 28. An air communicating channel 207 within housing 28 is coupled between air chamber 205 and a source of air pressure for causing an air flow to be directed against heat conducting fins 201, 202, 203, thereby causing the dissipating of heat brought out from the coil turns by the heat sink formed by fins 201, 202, 203 and the remaining fins extending from between these and other turns in directions parallel with the central axis 200. The second major face of primary coil 30 is faced with a polyamide insulating sheet 213. Where primary coil 30 comprised a winding of 50 turns and had a diameter of 1.4 inches, a 50 to 1 transformer ratio is thereby provided with respect to the secondary comprising metal disc-like member 32. As a consequence of this transformer ratio, where a current of 5 amperes is caused to flow through primary coil 30 then a current of up to 250 amperes is caused to flow through the member 32 of fastener assembly 37. It should be noted that coil 30 may be considered a cold heat source even when switch 500 in housing 28 has been depressed and ultrasonic frequency current has been applied via loads 501 and 503 to coil 30 from circuit 24 provided coil 30 is not coupled to an eddy current conducting metallic surface. The reason that coil 30 is wound from rectangular cross-section conductive material sometimes shown as flat ribbon wire and has the aforementioned small diameter is to enable concentration of magnetic flux and thus further improve the efficiency of the system. When coil 30 is connected in circuit with ultrasonic frequency current generator circuit 24 utilizing a single high speed SCR 601 within the predetermined frequency range hereinafter described, eddy current heating becomes optimized in the case of the present system. When compared to the prior application of heat by soldering iron to the hot melt type fastener, it may be noted that in the present system, the melt time becomes constant allowing control in application of heat over a predetermined time interval controlled in the present system by timing circuit 20. Also with the present induction heating system, the melt or cure time is reduced approximately 75 percent, thus affording efficient and precise control of energy in the fastener application process.

In more detail, primary coil 30 in a successful embodiment of the present system, was wound from flat copper strap having a dimension of 0.010 × 0.375 × 90 inches covered with 0.004 inch polyamide film to provide insulation between turns. Heat conducting fins 201, 202, 203, etc., were made from 3 one-inch lengths of 19 conductor flat cable (type MILC-55543/9A-H4E19) with three-fourths inch stripped from the 0.004 × 0.062 copper conductors thereof to form the actual heat conducting fins.

The strap material is wound on a three-eighths inch mandrel with adhesive applied between each turn. After one complete turn, the based copper strands of one width of the flat cable was interleaved in the winding process, and after two more complete turns of the winding process, a second length of flat cable was inserted while the third length of flat cable was interleaved after three more complete turns after which the remaining length of the strap material forming coil 30 was coiled. Coil 30 was faced with insulating sheet 213 and the entire coil assembly cured for approximately 2 hours at a temperature of about 180° F. After curing, coil terminals for coupling to leads 501 and 503 were formed by cutting off an insulated part of the end and center of the strap material forming coil 30 and a pin connector 580 type BACC47CN3 at the center of coil 30.

In the induction heating system of FIG. 1, a timing circuit 20 is utilized to provide application of energy from ultrasonic frequency generator 24 to primary coil 30 during a predetermined time interval since as recognized earlier, the melt time is a constant for a particular type hot melt fastener system. It is also desired that when the operator closes switch 500, energy will be coupled from generator circuit 24 via leads 501 and 503 to primary coil 30. It is also desirable that timing circuit 20 when coupled to alarm means 203 (comprising a 115 volt, 60 cycle buzzer) provide an audible alarm at the end of said predetermined time interval so that the operator is aware of the expiration of the heating interval and may proceed in time saving fashion immediately with coil 30 to the next fastener. Upon release of switch 500 (which was held down in closed contact position during the heating interval) subsequent to the alarm, the timer is reset and switch 500 may again be depressed for a succeeding heating interval with primary coil 30 above the next hot melt fastener. Timing circuit 20 was a motor driven type utilizing a magnetic clutch to initiate the time delay period. Timing circuit 20 comprised a Model K4130-U4-W1 time delay relay circuit manufactured by the A. W. Haydon Company of Waterbury, Connecticut (the numerals -12 correspond to those in the wiring diagram of the manufacturer).

When switch 500 in primary coil housing 28 is depressed, 115 volt A. C. power is applied across terminals 1 and 2 of timing circuit 20 energizing the clutch and timer motor and moving the switches from the dotted line non-energized state so that D. C. power source 22 is coupled to ultrasonic frequency source 24. More specifically, positive terminal 801 comprising the output terminal of D. C. power source 22 is connected by lead 803 to terminal 9 of timer circuit 20. Continuity provided between terminals 9 and 5 internally by timer circuit 20 causes this D. C. power available at terminal 5 to be connected through lead 907 to a first terminal 603 of capacitor means 605 and directly to lead 503 coupled to a first terminal 581 of primary coil 30. D. C. power source 22 is a full wave SCR type utilizing a zener diode 807 to clamp the control circuit portion 808 to a predetermined level. Since the triggering voltage of a unijunction transistor emitter is a fixed fraction of the interbase voltage, the capacitor 810 will charge until this trigger voltage is reached with the time being proportional to the series resistance 812. By varying variable resistance 812, the D. C. voltage applied to terminal 603 of the generator circuit may be controlled. Upon expiration of the heating interval, the timer motor will open the circuit between terminals 5 and 9 and D. C. power will no longer be applied to terminal 603 via lead 907. Also A. C. power will be applied via terminals 2 and 4 of timer circuit 20 across the alarm 203. Then upon release of switch 500 the clutch will be reset and the switches in timer circuit 20 driven by the clutch will return to their more energized condition (the dotted line position as shown).

Pulse generator circuit 26 is frequency controlled by the values of variable resistor 911 and capacitor 913 which resistor is adjustable to provide output pulses between leads 915 and 917 having frequencies below the frequency of the output coupled by leads 501 and 503 from generator circuit 24 to coil 30. Pulse generator circuit 26 is a unijunction transistor relaxation oscillator type circuit with zener diode 926 regulated D. C. supply. A pulse transformer 937 provides means for coupling pulse from pulse generator circuit 26 via leads 915 and 917 to the gate 941 of silicon controlled rectifier 601.

Turning now to ultrasonic electrical frequency generator circuit 24 operation, it will be noted that when a pulse from pulse generator 26 is applied to the gate 941 of silicon controlled rectifier 601 triggering gate 941, a current flows through the series circuit comprising silicon controlled rectifier 601, capacitor means 982 comprising parallel connected capacitors 983 and 984, and primary coil 30 which series circuit is connected across the D. C. potential from variable voltage D. C. supply 22 appearing across capacitor means 605 comprising first and second capacitors 857 and 858 connected in parallel. This series circuit current flow charges capacitor means 982 to a peak voltage and then capacitor means 982 discharges via the series circuit path including the capacitor means 982 coil 30 and diode 867 thereby providing the negative half of the output ultrasonic energy waveform. A series circuit path comprising diode 868 and inductor 777 is coupled across capacitance means 982, and another series path comprising resistance means 650 and capacitance means 989 is coupled across silicon controlled rectifier 601. This type of circuit as utilized heretofore with low impedance magnetostrictive loads, high impedance magnetostrictive loads and electrostrictive loads in coupling to ultrasonic transducer may be seen where reference is made to G. E. Application Notes 200.49 of 2/67.

The hereinafter disclosed table of values for a system circuit components including those utilized in ultrasonic frequency generator circuit 24 provides ultrasonic energy in coil 30 within the ultrasonic frequency range between about 25 kilohertz and 30 kilohertz. It was found that below about 25 kilohertz, air core transformer coupling between primary coil 30 and the eddy current conducting secondary was ineffective while above frequency of about 30 kilohertz, blocking of silicon controlled rectifier 601 occurred. Best results appeared obtainable when the pulse frequency of pulse generator circuit 26 was about 0.8 the frequency of the ultrasonic energy output from generator circuit 24.

In the exemplary system of FIG. 1, according to the invention, components and electrical values are as follows:

| | |
|---|---|
| RESISTORS | |
| 812 | 20K ohms variable |
| 911 | 20K ohms variable |
| 650 | 100 ohms 2 watts |
| CAPACITORS | |
| 857,858 | 200 mfd 450 volts |
| 983,984 | 2 mfd 600 volts |
| 989 | .015 mfd 600 volts |
| 913 | .033 mfd 200 volts |
| 810 | .22 mfd 200 volts |
| Zener DIODE | |
| 807 | 1N2984B |
| 926 | 1N2984B |
| SCR 601 | 2N3653 |
| TRANSFORMER | |
| 937,800 | pulse transformer, P.C.A. Electronics, Inc. Mod. No. MPT-111-5 |
| COIL | |
| 777 | 250 turns 16 AWG copper wire; on torroid ferrite core; coil inductance = 4.25 milihenries |
| DIODE | |
| 867 | A28C |
| 868 | A28C |

What is claimed is:

1. A fastening device for joining nonmetallic objects together comprising a sheet of eddy current conducting metallic material having a matrix area of vertical columns and horizontal rows of apertures, the spacing between geometrical centers of said apertures along the length and width of said matrix area equal to about twice the widths of said apertures, said sheets disposed between a pair of sheets of heat activatable material for providing hot melt bonds between said nonmetallic objects via said matrix of apertures, and means for adhesively securing an exposed surface area of at least one of said pair of sheets to a nonmetallic object.

2. An integral sandwich structure comprising an eddy current conducting sheet of material disposed between a pair of sheets of heat activatable material forming a first sandwich, said first sandwich positioned between a pair of sheets of nonmetallic material, said eddy current conducting sheet of material comprising a sheet of steel having a matrix area of apertures for providing direct hot melt bonds between said pair of sheets of nonmetallic material through said matrix of apertures, said sheet of steel having a thickness of about 0.002 inch, said apertures having widths of about 0.050 inch, and the spacing between geometrical centers of apertures along the length and width of said matrix being about 0.060 inch.

* * * * *